United States Patent [19]

Bello et al.

[11] Patent Number: 4,536,700
[45] Date of Patent: Aug. 20, 1985

[54] BOOST FEEDFORWARD PULSE WIDTH MODULATION REGULATOR

[75] Inventors: Vincent G. Bello; Charles W. Sweeting, both of Norwalk, Conn.

[73] Assignee: United Technologies Corporation, Hartford, Conn.

[21] Appl. No.: 594,137

[22] Filed: Mar. 28, 1984

[51] Int. Cl.³ .............................................. G05F 1/46
[52] U.S. Cl. ................................... 323/285; 323/288; 323/222
[58] Field of Search ...................... 363/21, 41, 95, 97; 323/285, 288, 222

[56] References Cited
U.S. PATENT DOCUMENTS 4,146,832  3/1979  McConnell .......................... 323/285
4,504,896  3/1985  Easter et al. ........................ 323/222

Primary Examiner—Peter S. Wong
Assistant Examiner—Judson H. Jones
Attorney, Agent, or Firm—Robert P. Sabath

[57] ABSTRACT

A boost feedforward circuit for a pulse width modulated DC power supply in which the duty cycle is determined by varying the error signal level with respect to the instantaneous level of a sawtooth waveform, under the influence of a feedforward portion of the input voltage.

7 Claims, 6 Drawing Figures $$V_{out} = V_{in} \frac{t_{on}}{T}$$

CONTROL SIGNALS

EMITTER VOLTAGE $$V_{out} = V_{in} \frac{T}{t_{off}}$$

$$V_{out} = V_{in} \frac{T}{t_{off}}$$

CONTROL SIGNALS

COLLECTOR VOLTAGE

4,536,700

BOOST FEEDFORWARD PULSE WIDTH MODULATION REGULATOR

The Government has rights in this invention, pursuant to Contract No. FO-4704-C-0070 awarded by the Department of the Air Force.

Cross Reference to Related Application

Cross reference is made to copending U.S. patent application Ser. No. 594,136, filed Mar. 28, 1984 having the title "Flyback Feedforward Pluse Width Modulation Regulator", said invention having the same inventors as the instant application.

DESCRIPTION

1. Technical Field

This invention is directed toward the art of feedforward circuits and more particularly to the art of feedforward circuits for pulse width modulated regulators in DC power supplies.

2. Background Art.

Pulse width modulation is a well known technique for DC voltage regulation, in which a constant output voltage is efficiently maintained despite wide variation in input voltage and output current. Voltage regulators employing pulse width modulation techniques are widely used in power supplies driving complex electronic systems.

There are various kinds of pulse width modulators, but generally speaking they all employ semiconductor switching to generate output rectangular voltage and current pulses which are effectively switched by an inductor-capacitor filter network to produce a constant output DC voltage level. The magnitude of the output voltage is controlled by the duty ratio of the semiconductor switch.

To maintain this output constant voltage level, a negative feedback arrangement is conventionally employed. This calls for a fixed fraction of the output voltage to be compared with a stable voltage reference, and developing an error signal which then effectively controls the duty ratio of the semiconductor switch.

The conventional switching power stage operates a transistor between on and off states, and smooths output pulses from the transistor to an average DC value which is a function of the on or off time. Smoothing the output pulses is accomplished by conventional filter circuitry which averages out the amplitudes of the switching pulses to produce a constant output voltage.

Feedback of an error signal is accomplished by an error amplifier and comparator operating at a nominal switching rate which is many times the power line frequency, for example in the vicinity of 20 kHz to 200 kHz. The error amplifier essentially operates to force the error signal to zero and force the output of the switcher (feed back through a resistor, for example,) to equal a reference voltage. When the output voltage of the switcher drops too low, the error amplifier turns on the switching transistor; when the output voltage rises too high, the switching transistor is turned off.

Reliable oscillation and regulation in these circuits are accomplished by either holding the pulse rate of the switcher constant and permitting only the pulse width (the "on" time) to vary; or holding the pulse width constant and permitting only the pulse rate to vary.

Switching regulators as discussed above can be implemented utilizing a series or shunt switching element, according to common knowledge in the art.

One way to obtain a variable pulse width is to compare the output of the error amplifier to a triangular wave, where the switching transistor on time is determined by the time that the triangular wave is less than the output of the error amplifier.

Although these circuits of the prior art are effective for many applications, the response time to variations in the input voltage is too slow. In many cases, the duty cycle of the switching transistor is thus too slow to compensate effectively for the change in input voltage.

Accordingly, it is an object of this invention to establish a switching regulator circuit arrangement which is effective for rapid response to input voltage fluctuations.

It is a further object of the instant invention to feed forward a portion of the input voltage in a switching regulator circuit arrangement in order to influence the duty cycle of the switching transistor of the arrangement toward enhanced responsiveness to changes in the input voltage.

It is another object of the instant invention to cancel the effect of an input voltage change in a switching regulator circuit arrangement.

DISCLOSURE OF INVENTION

The invention herein accomplishes the objects indicated above, including the establishment of more effective, swifter response to input voltage changes by feeding forward a portion of the input voltage to a critical point in the feedback network controlling the duty cycle of the switching transistor.

In particular, the input voltage is fed forward to a point beyond the output of the error amplifier. The output of the error amplifier feeds through a selected resistor, and the input voltage feeds through another selected resistor, permitting the two to combine at a common input terminal to the comparator and thereby to form the control voltage. The comparator compares the control input from the two resistors to a sawtooth voltage level, and outputs a signal to change the state of the switching transistor, whenever the level of the sawtooth waveform rises above or below the control voltage. If the control voltage against which the sawtooth is compared changes, the switching transistor "on" time changes, effectively changing the length of its duty cycle in order to keep the output voltage constant.

BRIEF DESCRIPTION OF DRAWING

The invention is best understood by reference to the drawing, which is in several figures, wherein.

BEST MODE FOR CARRYING OUT THE INVENTION

Figure 1A:
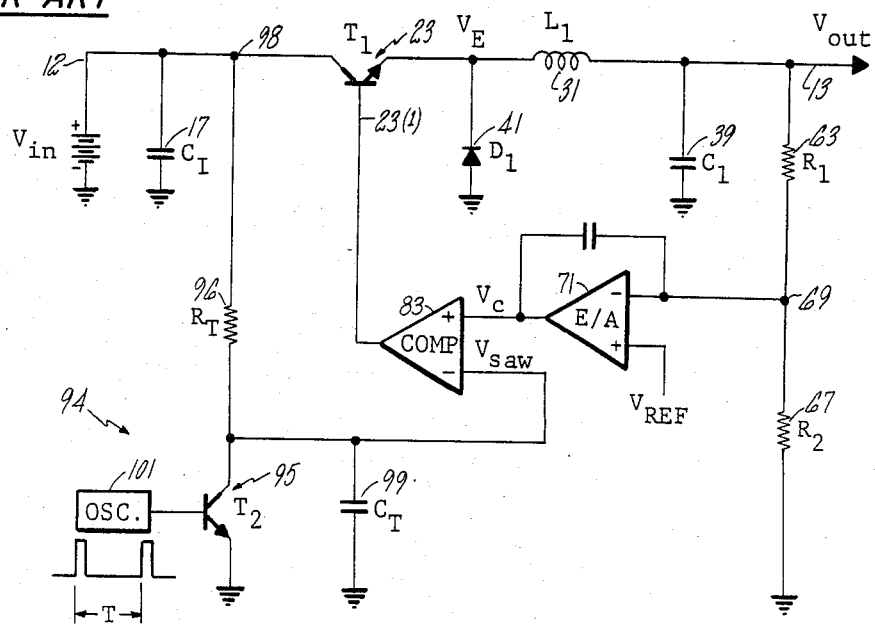
FIGS. 1A and 1B show respectively a buck feedforward circuit of the prior art, and associated voltage waveforms.
Figure 1B:
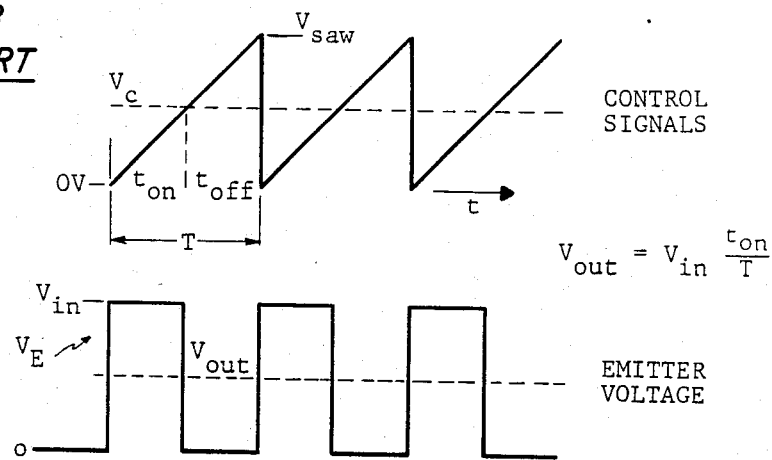

FIG. 1 shows a conventional buck feedforward circuit of the prior art for step-down voltage regulation between input and output terminals, respectively 12 and 13. The circuit includes an input capacitor 17 to filter input noise, which is connected to a suitable switching transistor 23.

The switching transistor 23 operates on a duty cycle to be discussed below, alternately switching between "on" and "off" states in accordance with a signal to its base or control side 23(1). The emitter output of the switching transistor 23, which in this case has been selected to be an "npn" transistor, is connected to an inductor 31, which in turn is connected to a capacitor 39 leading to ground. The output of the switching transistor 23 is additionally connected to the cathode of a diode 41 having a grounded anode.

When the switching transistor 23 is "on" and conducts, diode 41 is reverse biased and does not conduct. The current from the transistor 23 thus passes through inductor 31, charging capacitor 39 and passing to output 53.

When transistor 23 switches off, the inductor 31 maintains the current level existing while transistor 23 was "on". The inductor does so by drawing current from ground through now forward biased diode 41. Then as the current through the inductor 31 begins to diminish, capacitor 39 picks up and begins to supply the output 53 with a compensating level of current to maintain the output at substantially the same level.

The level of the output voltage at terminal 13 is monitored by a sampling or voltage divider network including in series to ground respectively resistors 63 and 67 with an output tap 69 therebetween. A selected portion of the output voltage is thus provided to an error amplifier 71 effective for comparing that portion of voltage with a reference voltage level.

The control voltage output of error amplifier 71 is fed to a comparator 83 which controls the switching of transistor 23 under direction of the error amplifier control voltage, $V_c$, from error amplifier 71, and a sawtooth voltage waveform produced by sawtooth generator 94 including an emitter grounded transistor 95, a resistor 96 to an input voltage connection 98, and ramp generating capacitor 99. The sawtooth voltage is created by sawtooth generator 94 acting upon a pulse pattern established by oscillator 101 feeding the base of transistor 95.

The output voltage from this conventional arrangement is that portion of the input voltage defined by the ratio of the time during which the switching transistor 23 is "on" to the period of the sawtooth waveform established by oscillator 101. Comparator 83 insures that transistor 23 is "on" whenever the output or control voltage of the error amplifier 71 exceeds the level of the sawtooth voltage waveform.

Correction for changes in the input voltage 98 is accomplished in the configuration of FIG. 1 by connecting the integrator resistor 96 to the input voltage rather than to a constant bias voltage. For a buck regulator, this causes essentially perfect correction with respect to input voltage changes. In such a buck regulator, the output voltage is proportional to the product of the input voltage and the on time for a constant period oscillator. By connecting resistor 96 to the input voltage, the saw amplitude and slope is made proportional to the input voltage, effectively forcing the on time to be inversely proportional to the input voltage, at a constant control voltage. Since the output voltage is directly proportional to the input voltage times the on time, which is now inversely proportional to the input voltage, any variation in the input voltage is completely and immediately cancelled, keeping the output voltage constant. This feedforward correction technique is well known and is not being claimed as part of the invention herein.

More particularly, feedforward correction for changes in the input voltage 98 is accomplished in the buck configuration by connecting the sawtooth generator resistor 96 to the input voltage. In a buck regulator the outut voltage is proportional to the product of the input voltage and on time for a constant period oscillator, i.e., $$V_{out} = V_{in} t_{on}/T \qquad (1)$$

where $V_{out}$ is the output voltage 13, $V_{in}$ is the input voltage 98, $t_{on}$ is the transistor switch 23 on time and T is the period of the oscillator 101 as shown in FIG. 1A. For exact feedforward the required on time is obtained from equation (1), giving;

$$t_{on} = T V_{out}/V_{in} \qquad (2).$$

By connecting resistor 96 to the input voltage, the saw amplitude and slope is made proportional to the input voltage forcing the on time to be inversely proportional to the input voltage for a constant control voltage, $V_c$. From the control signal waveforms shown in FIG. 1 the on time is given by:

$$t_{on} = V_c T/V_{saw} \qquad (3)$$

and the peak saw amplitude $V_{saw}$ is given by:

$$V_{saw} = V_{in} T/(R_T C_T) \qquad (4).$$

The on time is then:

$$t_{on} = V_c(R_T C_T)/V_{in} \qquad (5)$$

which is in the form required by equation (2), i.e., the on time is inversely proportional to the input voltage. Solving for the constants gives:

$$V_c R_T C_T = T V_{out} \qquad (6).$$

For a desired period, output voltage and control voltage, the required sawtooth generator time constant $R_T C_T$ is given by equation (6). Since the output voltage is directly proportional to the input voltage times on the time (equation (1)) and the on time is now inversely proportional to the input voltage (equation (5)), any variation in the input voltage is completely and immediately cancelled, keeping the output voltage constant. This feedforward correction technique is well known and is not being claimed as part of this patent.

Figure 2A:
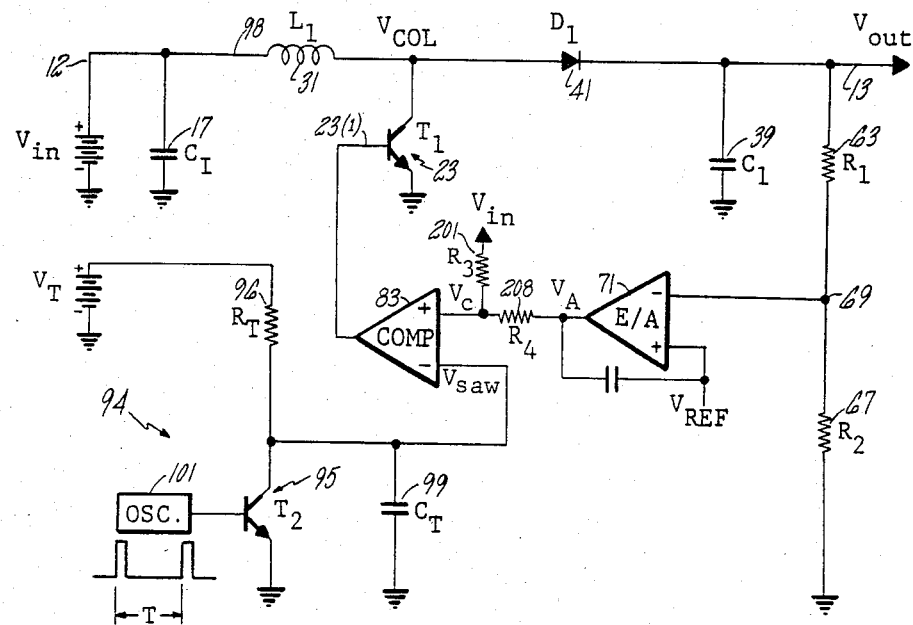
FIGS. 2A and 2B are respectively a boost feedforward circuit according to one preferred version of the invention and associated voltage waveforms.

FIG. 2A shows a boost feedforward inverted drive circuit according to the invention herein which is effective for boosting the input DC voltage level to a higher regulated DC voltage level. As in FIG. 1, the circuit employs a switching transistor 23 with an on/off ratio determined by a control signal at its control side or base 23(1). During the "on" period, transistor 23 conducts current from the input through inductor 31 to ground. When the transistor 23 is turned off, the current through inductor 31 travels through diode 41, charging capacitor 39.

Figure 2B:
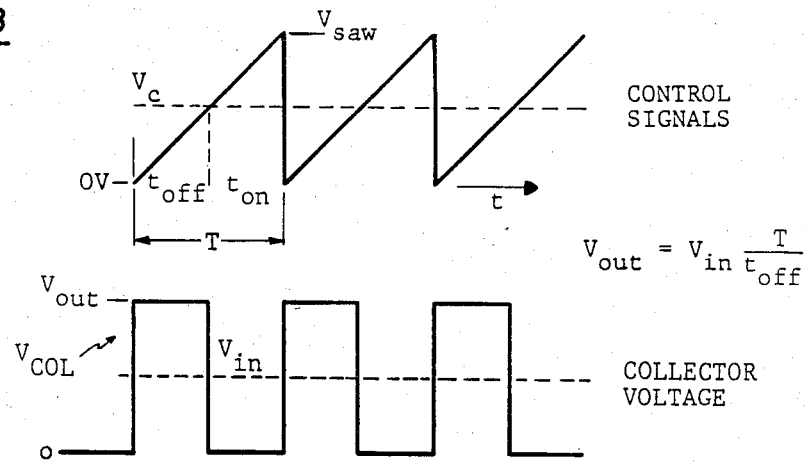

The remainder of the circuitry in FIG. 2 is similar to the circuit in FIG. 1, with comparator 83 again controlling the state of transistor 23 in view of the amount by which the sawtooth voltage level rises above (rather than below) the control voltage level, $V_c$. However, the control voltage level against which the sawtooth is compared is subject to the level of the input voltage and changes therein as transmitted through selected intervening resistors 201 and 208, which are respectively connected to the input voltage and the output of the error amplifier 71 on one end, and to an input with respect to comparator 83 on the other end. Sawtooth generator 94, including transistor 95, resistor 96, and capacitor 97, operates as before in conjunction with oscillator 101, except that in this case according to the invention herein, resistor 96 is connected to a selected constant voltage $V_T$, maintaining the sawtooth at a constant slope and at a fixed or established peak amplitude.

For boost circuit with inverted drive as shown in FIG. 2A, the control signals are as follows:

$$t_{off} = V_c T/V_{saw} \qquad (7).$$

Substituting into equation (8) gives the required control voltage, $$V_c = V_{saw} V_{in}/V_{out} \qquad (8).$$

The feedforward circuit shown in FIG. 2 gives $V_c$ in this form, i.e., $$V_c = V_A R_3/(R_3+R_4) + V_{in}R_4/(R_3+R_4) \qquad (9).$$

Solving for the circuit constants gives $$R_4/(R_3+R_4) = V_{saw}/V_{out} \qquad (10)$$

and $$V_A = 0 \qquad (11).$$

With these circuit constants the off time is made proportional to the input voltage and any variation in the input voltage is cancelled, keeping the output voltage constant.

Figure 3A:
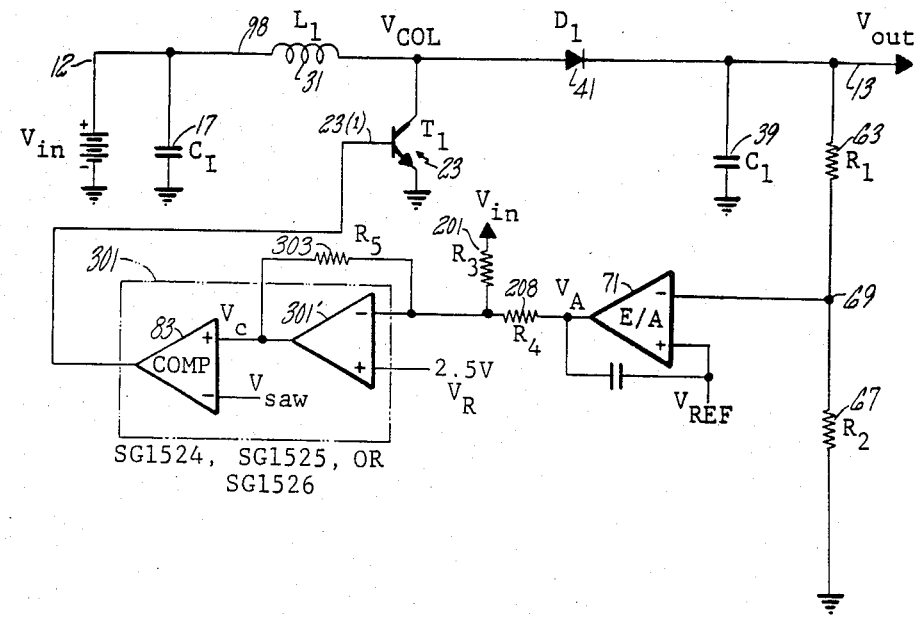
FIGS. 3A and 3B are respectively a boost feedforward circuit according to another preferred version on the invention and voltage waveforms associated therewith.

FIG. 3A shows a preferred way of carrying out the invention just described in terms of FIG. 2. In particular, a semiconductor chip, such as a SG1524, SG1525, or SG1526, available from Silicon General in Garden Grove, Calif., can be employed as a regulating pulse width modulator 301 to provide the control signal governing the operation of transistor 23. The sawtooth provided by the Silicon General chip has a constant amplitude and a constant period. The chip provides an inverter 301' which requires the use of resistor 303 to establish the control voltage, $V_c$.

The boost feedforward converter of the invention herein requires a different kind of feedforward correction than the buck converter of the prior art in FIG. 1, because in the boost converter, the output voltage is directly proportional to the input voltage and inversely proportional to the off time for a constant period oscillator, i.e., $$V_{out} = V_{in}T/T_{off} \qquad (12)$$

where $V_{out}$ is the output voltage, $V_{in}$ is the input voltage, T is the period and $t_{off}$ is the off time of transistor switch 23 in FIG. 3A. Accordingly, for exact feedforward the required off time from equation (12) is $$t_{off} = V_{in}T/V_{out} \qquad (13).$$

In order to essentially perfectly cancel variations in the output voltage, the feedforward correction under the invention must establish an off time proportional to the input voltage.

Figure 3B:
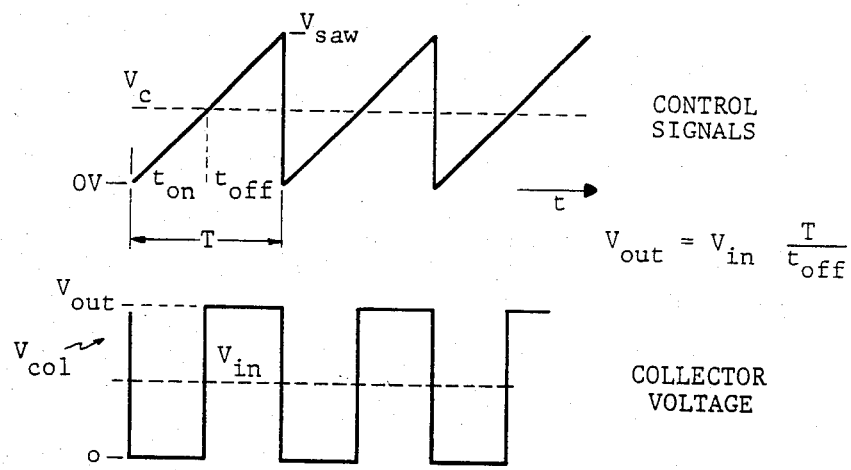

This is accomplished in the boost converter of this invention by using resistor 201 connected to the input voltage, to sum the input voltage with control voltage $V_c$. Thus, when the input voltage increases, the control voltage decreases in proportion to the input voltage for a constant error amplifier output voltage $V_A$, causing the off time to increase in direct proportion to the input voltage. From the control signal waveforms shown in FIG. 3B, the on time is again given by $$t_{on} = V_c T/V_{saw} \qquad (14)$$

and $$t_{off} = T - t_{on} = T(1 - V_c/V_{saw}) \qquad (15).$$

Substituting into equation (13) and solving for the required control voltage gives $$V_c = V_{saw}(1 - V_{in}/V_{out}) \qquad (16).$$

The feedforward circuit shown in FIG. 3 gives $V_c$ in exactly this form, i.e., $$V_c = -V_A R_5/R_4 - V_{in}R_5/R_3 + \frac{R5}{R3 \| R4 \| R5} V_R \qquad (17)$$

Setting equation (17) equal to equation (16) and solving for the circuit constants gives $$R_5/R_3 = V_{saw}/V_{out} \qquad (18)$$

and $$V_{saw} = -V_A \frac{R5}{R4} + \frac{R5}{R3 \| R4 \| R5} V_R \qquad (19)$$

With these circuit constants then, the off time is made proportional to the input voltage, i.e., $t_{off} = V_{in}T/V_{out}$.

Since the output voltage is directly proportional to the input voltage divided by the off time and the off time is directly proportional to the input voltage, any variation in the input voltage is essentially completely and immediately cancelled, keeping the output voltage constant. This feedforward technique for boost converters is considered novel as claimed herein. In contrast to the prior art where the saw amplitude had to vary in a prescribed manner, here the saw amplitude should be kept constant and the control voltage should be varied.

The description above is likely to induce individuals skilled in the art to develop variations or related embodiments of the invention, which nonetheless fall within the scope thereof. Accordingly, reference to the claims which follow is urged, as these define with particularity the metes and bounds of the invention addressed herein.

We claim:

1. A feedforward circuit including a circuit input and an output in a pulse width modulated power supply, comprising:

switching means including input, output and control sides, for passing power in successive on and off states;

inductive means including input and output sides, for maintaining a current throughout between said circuit input and output;

diode means for transferring current with respect to said inductive means, said diode and inductive means being electrically connected in series, and said diode means being reverse biased during the on states of said switching means;

capacitor means for storing charge, including respective output and grounded sides, the output side of said inductor and capacitor means being electrically connected at the circuit output;

sampling means for sampling a selected portion of the output voltage at said circuit output;

error means including an error output for establishing an error difference between said selected portion of said output voltage and a selected reference voltage;

sawtooth means for establising a sawtooth waveform of characteristic slope and peak amplitude;

comparator means including sawtooth and error inputs and an output, for establishing the on and off times of said switching means with respect to the difference between the respective levels of said sawtooth and error inputs; and feedforward means for modifying the level of said error output in terms of changes in the level at said circuit input, whereby said feedforward means is effective for modifying the duty cycle of said switching means without affecting the slope and peak amplitude of said sawtooth waveform.

2. The method of establishing a feedforward circuit including a circuit input and an output in a pulse width modulated power supply, comprising the steps of:

(a) periodically switching between on and off states of a switching means for passing power, including input, output and control sides;

(b) electrically correcting an inductive means including input and output sides, for maintaining a current throughout between said circuit input and output;

(c) electrically connecting a diode means for supplying current with respect to said inductive means, said diode and inductive means being electrically connected in series, and said diode means being reverse biased during the on states of said switching means;

(d) electrically connecting a capacitor means for storing charge, including respective output and grounded sides, the output side of said capacitor means being electrically connected at said circuit output;

(e) electrically connecting at said cicuit output a sampling means for sampling a selected portion of the output voltage at said circuit output;

(f) providing an error means including an error output for establishing an error difference between said selected portion of said output voltage and a selected reference voltage;

(g) establishing a sawtooth means for providig a sawtooth waveform of characteristic slope and peak amplitude, including an oscillator for establishing a switching period;

(h) providing a comparator means including sawtooth and error inputs and an output, for establishing the on and off times of said switching means with respect to the difference between the respective levels of said sawtooth and error inputs;

(i) electrically connecting a feedforward means for modifying the level of said error output in terms of changes in the level at said circuit input, whereby said feedforward means is effective for modifying the duty cycle of said switching means without affecting the slope and peak amplitude of said sawtooth waveform.

3. The invention of claims 1 or 2, wherein the output of said comparator means is electrically connected to the control side of said switching means.

4. The invention of claims 1 or 2, wherein said sampling means includes a voltage divider circuit for determining the selected portion of said output voltage to be sampled.

5. The invention of claims 1 or 2, wherein sid feedforward means includes first and second resistive means for establishing a modified error output level, respectively electrically connected to said circuit input and said error output on one side, and electrically connected to said error input on the other side.

6. The invention of claims 1 or 2, wherein said sawtooth means includes an oscillator for establshing a switching period.

7. The invention of claims 1 or 2, wherein said sawtooth means includes a semiconductor chip sawtooth generator element.

* * * * *

UNITED STATES PATENT AND TRADEMARK OFFICE
CERTIFICATE OF CORRECTION

PATENT NO. : 4,536,700

DATED : August 20, 1985

INVENTOR(S) : Vincent G. Bello and Charles W. Sweeting

It is certified that error appears in the above-identified patent and that said Letters Patent is hereby corrected as shown below:

Column 1, line 6: after "Contract No." change "FO-4704-C-0070" to --F04704-79-C-0070--

Column 8, line 38: after "wherein" change "sid" to --said--

Signed and Sealed this

Seventh Day of January 1986

[SEAL]

Attest:

DONALD J. QUIGG

Attesting Officer

Commissioner of Patents and Trademarks